Patented Nov. 21, 1933

1,936,474

UNITED STATES PATENT OFFICE 1,936,474

DISULPHURIC ESTER OF DIHYDRO-3.3'-DICHLOR-DIANTHRAQUINONE-1.2.2'.1'-DIHYDROAZINE

David Alexander Whyte Fairweather and John Thomas, Grangemouth, Scotland, assignors to Scottish Dyes Limited, Grangemouth, Scotland No Drawing. Application January 16, 1930, Serial No. 421,307, and in Great Britain January 25, 1929

1 Claim. (Cl. 260—31)

This invention relates to the production of a new body, and consists in the provision of the disulphuric ester of dihydro-3.3'-dichlor-dianthraquinone-1.2.2'.1'-dihydroazine, a suitable process comprising the treatment of the disulphuric ester of dihydro-2-amino-3-chlor-anthraquinone, or soluble salts such as the sodium salt, with an oxidizing agent, for example, potassium ferri-cyanide in a medium which is acid, but not acid to Congo red paper, for example, in a medium containing acetic acid.

The following example illustrates how the invention may be carried into effect, references to parts and to percentages being to parts and to percentages by weight:—11 parts of the sodium salt of 1-amino-3-chloranthrahydroquinone-disulphuric ester in solution in water are neutralized with acetic acid and a further 8 parts of acetic acid added. The temperature is raised to 40° and 100 parts of a 10% solution of ferric chloride is added. After stirring for fifteen minutes, the dark blue precipitate is filtered off, and washed with cold water. This is the body referred to above as the disulphuric ester of dihydro-3.3'-dichlor-dianthraquinone-1.2.2'.1'-dihydroazine. It dissolves in hot water with a blue colour.

The equation involved appears to be as follows:—

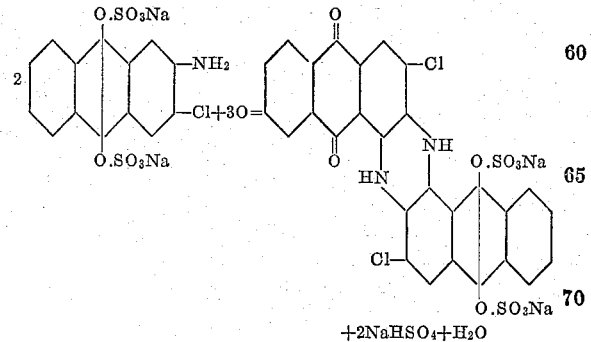

$+2NaHSO_4+H_2O$

Having now described our invention, what we claim as new and desire to secure by Letters Patent is:—

Disulphuric acid ester of dihydro-3.3'-dichlor-dianthraquinone-1.2.2'.1'-dihydroazine.

DAVID ALEXANDER
WHYTE FAIRWEATHER.
JOHN THOMAS.